United States Patent [19]

Kitai et al.

[11] 4,275,955
[45] Jun. 30, 1981

[54] SHUTTER RELEASE INTERRUPTING SYSTEM

[75] Inventors: Kiyoshi Kitai; Yuzuru Takazawa; Shinji Nagaoka, all of Shikawatashi, Japan

[73] Assignee: Seiko Koki Kabushiki Kaisha, Tokyo, Japan

[21] Appl. No.: 12,508

[22] Filed: Feb. 15, 1979

[30] Foreign Application Priority Data

Feb. 20, 1978 [JP] Japan .............................. 53-20521[U]

[51] Int. Cl.³ ............................................. G03B 17/38
[52] U.S. Cl. .................................................. 354/268
[58] Field of Search ................ 354/50, 51, 60 R, 234, 354/235, 238, 268, 258

[56] References Cited

U.S. PATENT DOCUMENTS

| 3,435,745 | 4/1969 | Fukushima | 354/268 X |
| 3,955,209 | 5/1976 | Akiyama et al. | 354/234 |
| 4,034,383 | 7/1977 | Mashimo et al. | 354/51 X |
| 4,161,355 | 7/1979 | Sahara et al. | 354/60 R X |

Primary Examiner—L. T. Hix
Assistant Examiner—William B. Perkey
Attorney, Agent, or Firm—Robert E. Burns; Emmanuel J. Lobato; Bruce L. Adams

[57] ABSTRACT

The shutter release button operation is interrupted and a warning is given when the shutter release button is depressed in an excessively quick action which may cause camera shake, to prevent faulty photographing. In addition, with provision of a voltage reference function, irregular shutter operation can be prevented by locking the shutter in case the voltage of the power source has dropped under a prescribed level. Simply composed, the system is applicable to the shutter without difficulty.

2 Claims, 5 Drawing Figures

SHUTTER RELEASE INTERRUPTING SYSTEM

BACKGROUND OF THE INVENTION

The field of art to which the present invention pertains includes shutter control systems. This invention provides a shutter release interrupting system to prevent faulty photographing resulting from camera shake or irregular operation of the shutter caused by an excessively quick operation of the shutter release button.

The prior art to which the present invention is directed includes the art of interrupting the movement of the shutter release button. There has been provided a system having an electromagnet for the shutter control wherein during the depression of the shutter release button, the operation of the shutter button is interrupted and locked when the electromagnet does not function normally due to such cause that the electromagnet is not magnetized.

There has also been provided a camera having a shutter system capable of preventing faulty exposure by locking the release button in case the voltage of the power source is dropped under a prescribed level or when the brightness of the object is insufficient.

BRIEF SUMMARY OF THE INVENTION

Accordingly, it is an object of the present invention to provide an electronic shutter, having a system which locks the shutter release button when an electromagnet is not magnetized, wherein a time constant circuit is actuated in synchronism with closing of a power switch and an output signal of the time constant circuit delays activation of the electromagnet for a fixed period of time after closing the power switch, therefore, the shutter functions normally when the shutter release button is depressed properly with a moderate quickness while the shutter is locked and a warning is given to recommence the depression of the shutter release button when the release button is depressed with an excessive quickness which will cause camera shake or impair the function of the shutter.

It is another object of the present invention to provide a system wherein the abovementioned time constant circuit can be used as a voltage checking circuit for checking the voltage of the power source incorporated in the input circuit, and when the voltage of the power source has dropped under a prescribed level, a signal is given to interrupt operation of the shutter, as in the case of excessively quick operation of the release button, to prevent faulty exposure.

DETAILED DESCRIPTION

Figure 1:
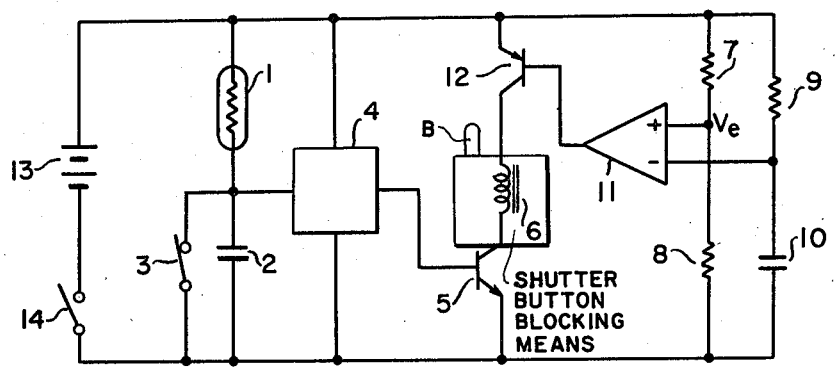
FIG. 1 shows a shutter release interrupting system according to the present invention.

Referring to FIG. 1, reference numeral (1) indicates a phototransducer, such as a CdS photocell. A condenser (2) is connected in series with the phototransducer (1) to form a CR integrating circuit. A normally closed type timing switch (3), arranged to be actuated in connection with operation of the shutter, is connected to both ends of the CR integrating circuit. An IC (4) has a comparator circuit for comparing input signals with a reference level and a switching circuit which is operated by the output signal of the comparator circuit. The output of the CR integrating circuit is applied to the input terminal of the IC (4). The base of a transistor (5) is connected to the output terminal of the IC (4). An electromagnet controls closing timing of the shutter. Fixed resistances (7) and (8) are connected in series with each other and the junction between them is connected to a first input terminal of a comparator (11). A fixed resistance (9) and a time constant condenser (10) form an integrating circuit, the output of which is connected to a second input terminal of the comparator (11).

The output of the comparator (11) is connected to the base of a transistor (12). The collector of the transistor (12) is connected to an electromagnet (6). Reference numerals (13) and (14) indicate a battery and a power switch, respectively.

Figure 2:
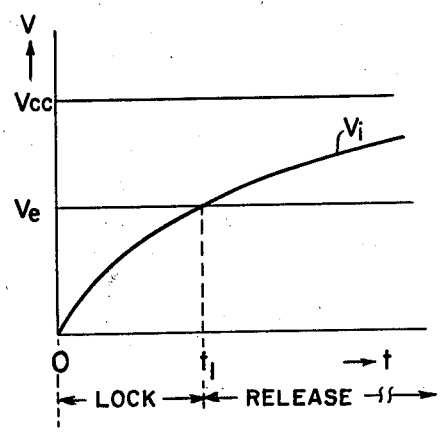
FIG. 2 is a diagram of assistance in explaining the operation of the system of FIG. 1.

In operation, depression of the release button B causes the power switch (14) to close to activate the circuits. The input of the IC (4) is at zero potential as the timing switch (3) remains closed. The output of the IC (4) keeps the transistor (5) in closed state. The terminal voltage of the condenser (10) applied to the second input terminal of the comparator (11) increases gradually from zero as charging of the condenser (10) through the fixed resistance (9) starts when the power switch (14) is closed. FIG. 2 shows the increase of the terminal voltage of the condenser (10) relative to the time passed since the power switch (14) was closed. In FIG. 2, the diagram shows charged voltage Vi as the y coordinate axis while time t after closing of the power switch as the x coordinate axis. The first input to the comparator (11) is determined depending on the values of the bleeder resistances (7) and (8). The first input to the comparator (11) is previously adjusted to Ve as shown in FIG. 2. Immediately after the closing of the power switch (14), the transistor (12) is kept open by the output of the comparator (11). The transistor (12) remains opened and the electromagnet (6) remains unmagnetized because the output of the comparator (11) is in a high level until the charged voltage of the condenser (10) exceeds the set point Ve. Consequently, depression of the release button is impossible as a release button locking mechanism is actuated if the release button is operated while the electromagnet 6 is unmagnetized.

After a time tl has passed since the power switch (14) was closed, the charged voltage Vi of the condenser (10) reaches the voltage Ve as shown in FIG. 2, then the output of the comparator (11) inverses so that the transistor (12) is closed. At this time, the transistor (5) connected to the output of the IC (4) also being in closed state, the electromagnet (6) is magnetized to allow successive operation of the shutter. Thus the integrating circuit composed of the bleeder resistances (7) and (8), condenser (10) and the fixed resistance (9) the circuit composed of the comparator (11) and the power transistor (12) co-operate to delay the activation of the electromagnet (6) after the power switch is closed for a fixed time tl during which operation of the release button is kept locked to prevent faulty exposure. A known shutter control circuit shown in FIG. 1 controls the shutter operation when the release button is depressed properly. In this normal shutter release operation, the timing switch (3) is opened and the condenser (2) is charged through the phototransducer (1) interlocking with opening of the shutter blade according to the progressive depression of the release button. The comparator circuit of the IC (4) detects the level of the charged voltage of the condenser (2) and when the charged voltage of the condenser (2) reached a fixed level, the output of the IC (4) inverses to open the transistor (5) connected to the output terminal of the IC (4) so that the electromagnet (6) is unmagnetized and the shutter blade closes. The resistance of the phototransistor (1) controls the charging current applied to the condenser (2), therefore, the shutter speed is regulated corresponding to the brightness of the object.

Figure 3:
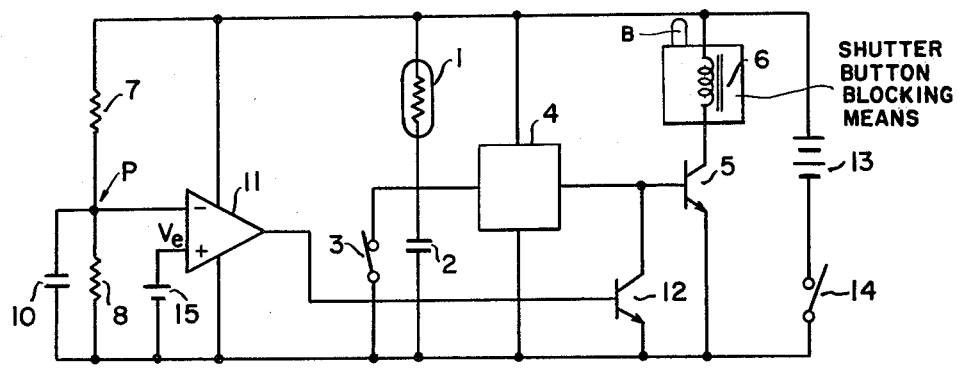
FIG. 3 shows another embodiment according to the present invention.

Referring now to FIG. 3 showing another embodiment of the present invention, the function of those elements indicated by reference numerals from (1) to (14) is identical with the function of those indicated by corresponding reference numerals in FIG. 1.

Figure 4A:
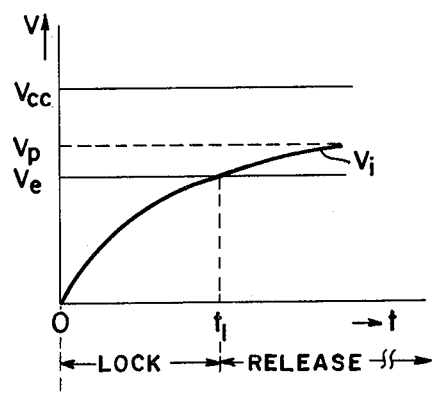
FIGS. 4a and 4b are diagrams of assistance in explaining the operation of the invention.

A battery (15) connected to the first input terminal of the comparator (11) provides a reference voltage. The battery (15) may be replaced with a constant- voltage circuit such as a zener diode. In operation, when the power switch (14) is closed in the initial stage of depression of the release button, the integrating circuit, composed of the resistance (7) forming the time constant circuit and the condenser (10), is activated. The charged voltage of the condenser (10) reaches Ve after a timer tl since the power switch was closed as shown by the diagram of FIG 4a. The voltage Ve is equivalent to the battery voltage of the battery (15) applied to the first input terminal of the comparator (11). The transistor (12) is maintained closed while the output of the comparator (11) is high. The transistor (12) is opened as the output of the comparator (11) inverses when the level of the charged voltage of the condenser (10) reaches the level of the reference voltage Ve. As for the shutter control circuit, the output of the IC (4) being at a high level, the transistor (5) is closed to activate the electromagnet (6) immediately after the transistor (12) has been opened, similarly to the procedure explained in the description of the first embodiment of FIG. 1. Thus the activation of the electromagnet is delayed for a time tl after closing the power switch (14), therefore, the shutter operation is possible after a time tl since the power switch has been closed.

Figure 4B:
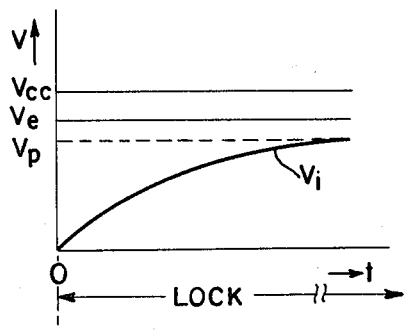

Explanation has been made on the operation of the system when the voltage of the power source is normal, now explanation will be made hereinafter on the procedure for interrupting the shutter release operation in case the voltage Vcc of the power source has dropped and is insufficient for the shutter release operation. FIG. 4b shows the transition of charged voltage of the condenser (10) in the time constant circuit with time after the closing of the power switch. The battery (15) applied the reference voltage Ve to the comparator (11). The voltage of the condenser (10) increases gradually until it reaches the voltage at the junction P of the fixed resistances (7) and (8) forming a bleeder circuit. When the voltage Vcc of the power source (13) has dropped under a level insufficient for the shutter operation, the charged voltage Vi of the condenser (10) will not reach the reference voltage Ve as shown by the diagram of FIG. 4b, consequently, the transistor (5) is opened while the transistor (12) connected to the output terminal of the comparator (11) remains closed so that the electromagnet (6) is not energized and the operation of the release button is impossible.

In this manner, the operation of the shutter operation is interrupted to prevent faulty exposure when the voltage of the power source is insufficiently low for the shutter ooeration.

The lower limit for the power source voltage is possible to be set by properly selecting the reference voltage Ve or the bleeder resistances (7) and (8). The delay time tl, the time from closing of the power switch to activation of the electromagner (6), is possible optionally to be set by properly fixing the resistance (9) or the capacity of the condenser (10) in the embodiment of FIG. 1, and also by properly fixing the resistance (7), capacity of the condenser (10) or the reference voltage Ve in the second embodiment of FIG. 3. In practice, tl of about 10 ms will be proper for the effective operation of the system, however, the value of tl may vary depending on the type of the camera.

As the invention may be embodied in several forms without departing from the spirit of essential characteristics thereof, the present imbodiments, as has been described, are therefore illustrative and not restrictive, since the scope of the invention is defined by the appended claims rather than by the description preceeding them, and all changes that fall within bounds of the claims, or equivalence of such bounds are therefore intended to embraced by the claims.

We claim:

1. A shutter release interrupting system comprising a shutter release button, a power source, a power source switch which is closed by an initial increment of movement of said shutter release button, and means for stopping the depression of said shutter release button when said shutter release button is pushed down more rapidly than a predetermined speed, said shutter release button stopping means comprising electromagnet means for stopping depression of said shutter release button, said stopping means being normally in condition to block further depression of said shutter release button and being operable to produce an unblocking condition, and a delay time control circuit for said electromagnet means, including an RC integrated circuit and a voltage comparator, said control circuit being actuated upon closing of said power switch and providing an output signal a predetermined delay time after closing of said power switch, said electromagnet means being connected with the output of said delay time control circuit, whereby activation of said electromagnet means to produce said unblocking condition is delayed by said delay time control circuit for a predetermined period of time after said power switch is closed.

2. A shutter release interrupting system according to claim 1, wherein delay time control circuit comprises means for checking the power source voltage and maintaining said electromagnet means in blocking condition if said power source voltage is below a predetermined level.

* * * * *